July 4, 1972   A. CHERNOTSKY ET AL   3,674,345
SOUND MOVIE PROJECTOR
Filed June 30, 1970   4 Sheets-Sheet 1
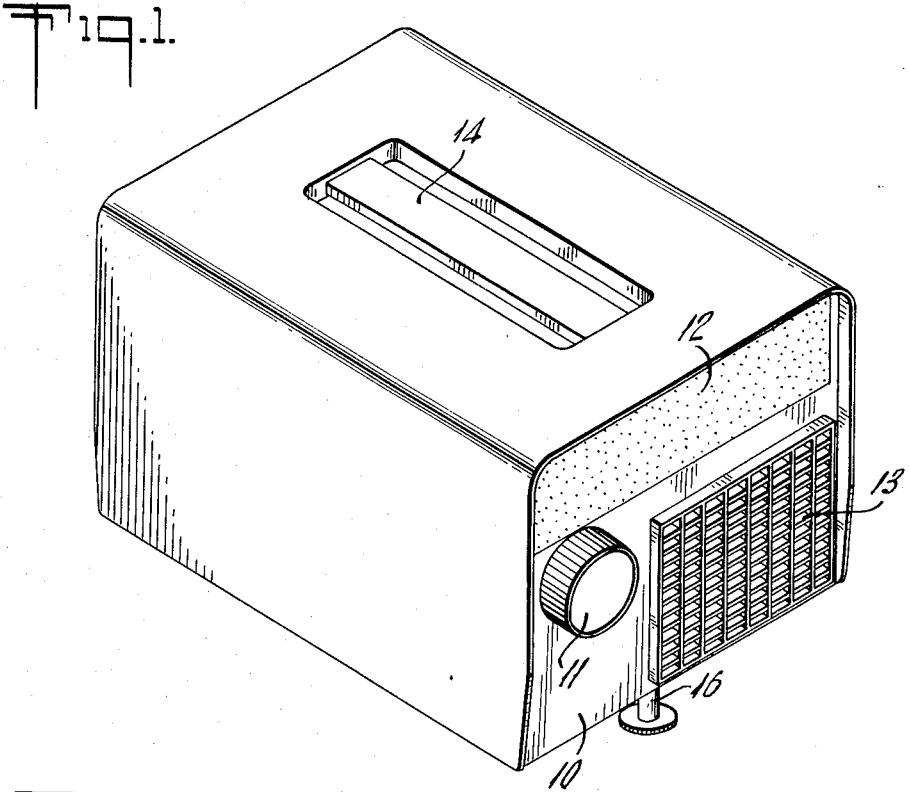
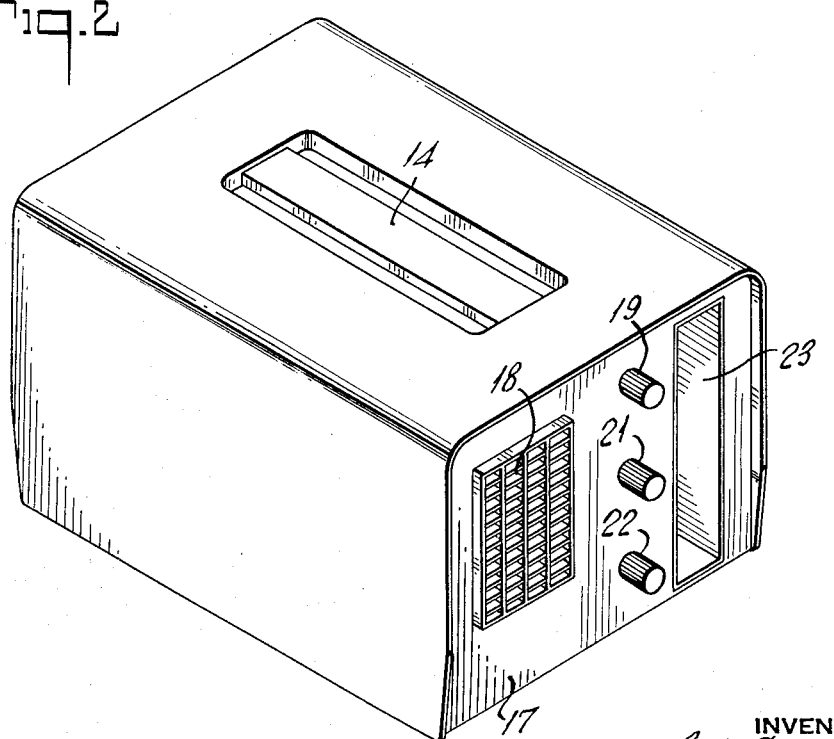
INVENTORS
ALAN CHERNOTSKY
RICHARD SATZ
BY
Lerner, David, & Littenberg
ATTORNEYS

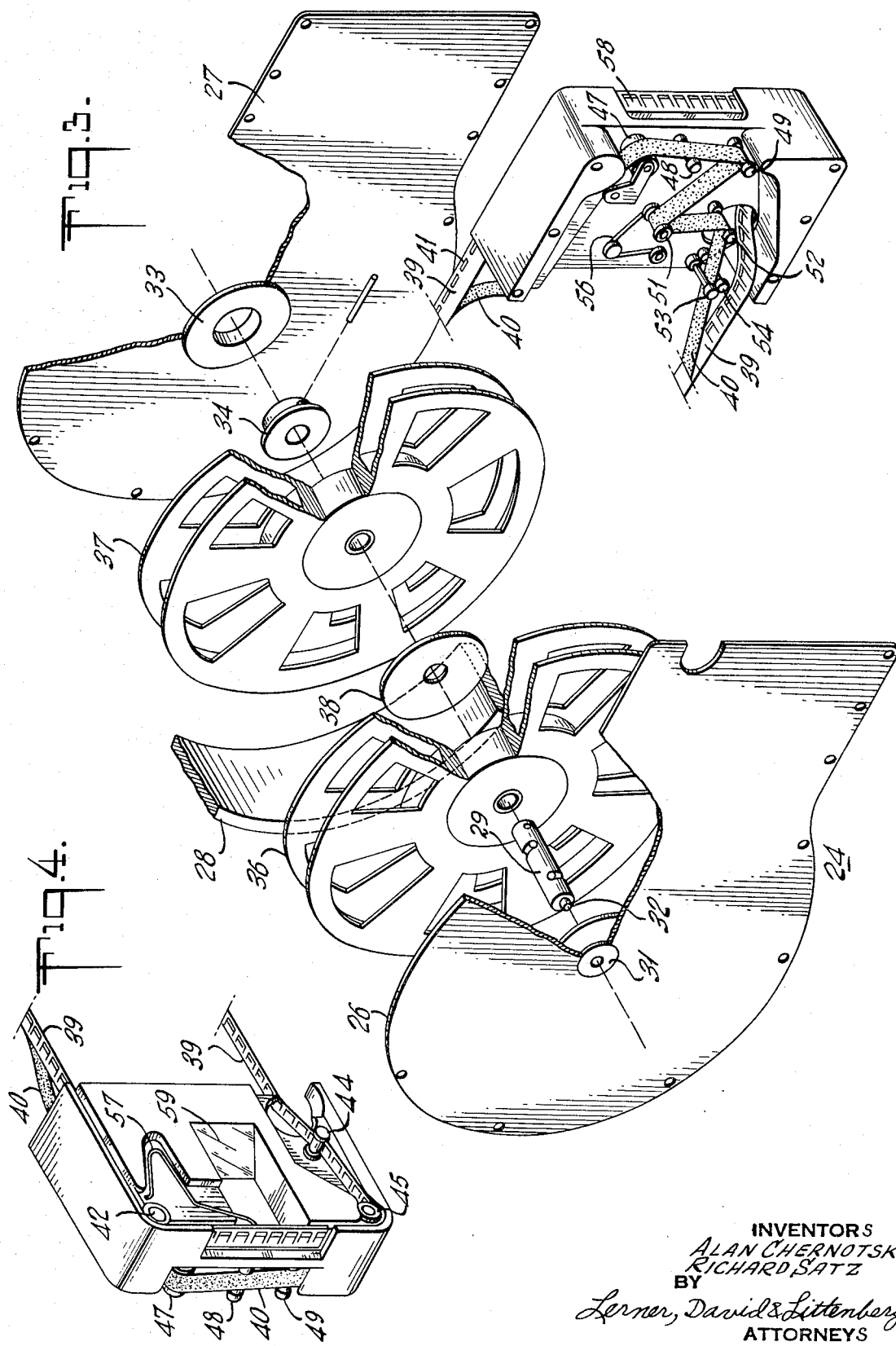

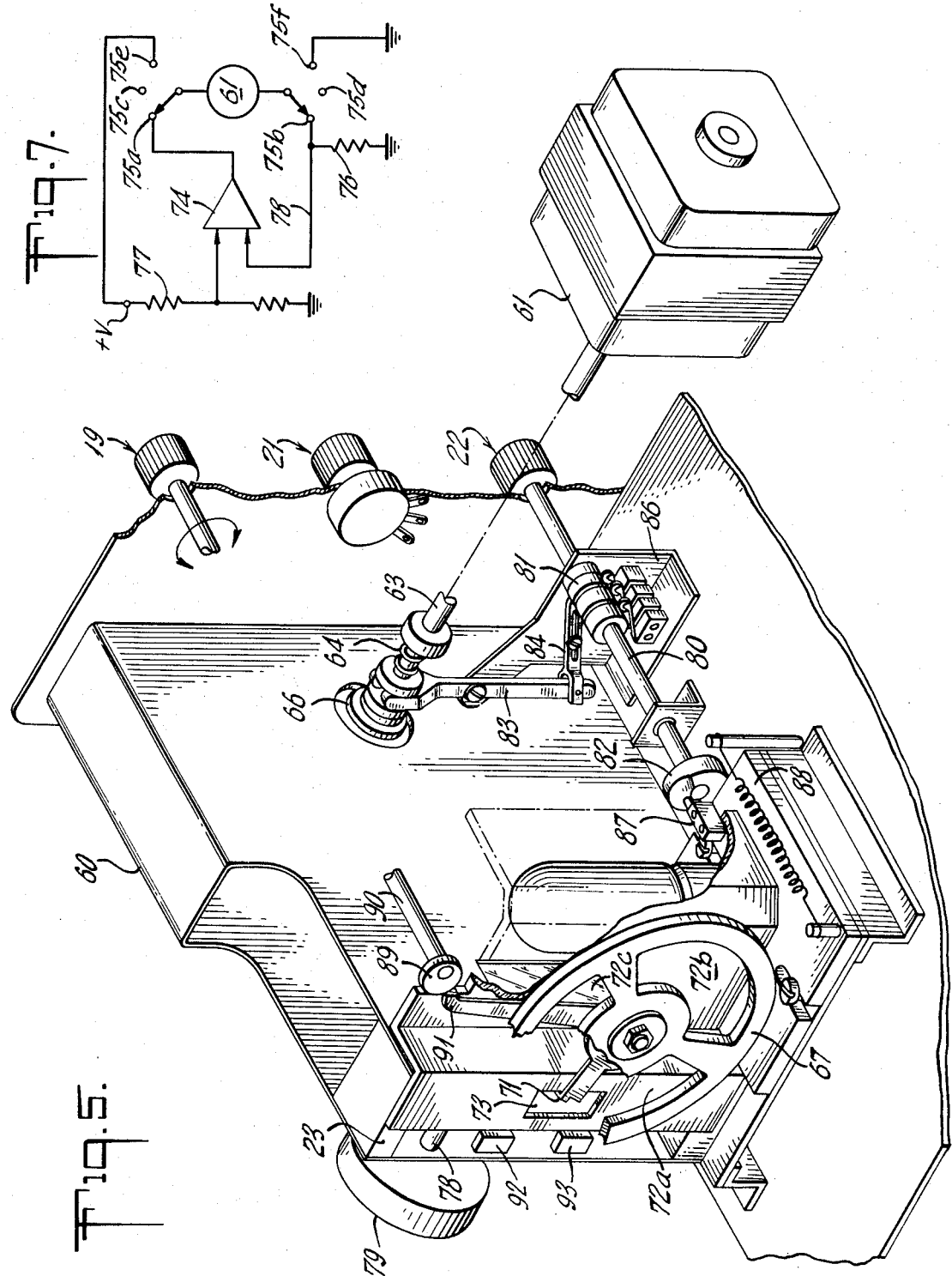

July 4, 1972 — A. CHERNOTSKY ET AL — 3,674,345

SOUND MOVIE PROJECTOR

Filed June 30, 1970 — 4 Sheets-Sheet 4

INVENTORS
ALAN CHERNOTSKY
RICHARD SATZ
BY
Lerner, David, & Littenberg
ATTORNEYS

United States Patent Office 3,674,345
Patented July 4, 1972

---

3,674,345
SOUND MOVIE PROJECTOR
Alan Chernotsky, 36 Lakeshore Drive, Rockaway, N.J. 07866, and Richard Satz, Succasunna, N.J.; said Satz assignor to said Chernotsky
Filed June 30, 1970, Ser. No. 51,217
Int. Cl. G03b 31/04, 23/02
U.S. Cl. 352—31
13 Claims

ABSTRACT OF THE DISCLOSURE

A projector for showing sound movies stored in a cartridge on silent motion picture film and magnetic recording tape is disclosed. The silent motion picture film and the magnetic recording tape are wound interleaved on a reel. The tape and the film on the reel each follow a path through the cassette in which portions thereof coincide and portions thereof separate to allow for projection of the film and playback or recording on the tape. A guide roller mechanism for the tape is also disclosed which includes a mechanism for maintaining a tension on the tape to take up any slack which develops in the tape and also helps in smoothing out the instantaneous tape velocity as it travels along its path.

A half silvered mirror is mounted in the cassette at an angle with respect to a line normal to the plane in which the film travels along its path.

A circuit is also disclosed for driving a motor in a constant current mode to produce a constant torque on the ends of the film and the tape as a pair of shutter fingers advance the film. In this way, motion is imparted to the ends of the tape thereby moving the tape at the same average velocity as the film. Inertial means are associated with the tape to smooth out the intermittent motion caused by the shutter fingers.

FIELD OF THE INVENTION

This invention relates to a home movie projector and particularly to a movie projector for showing sound movies at home.

BACKGROUND OF THE INVENTION

Ever since the advent of motion pictures, people have been intrigued with the idea of making home movies. Today millions of people make and enjoy silent home movies. The few who can afford thousands of dollars for equipment make and enjoy sound movies at home.

Most sound movie making systems employed today record the sound on a film track or sound track which is merely an area along the side of the film that the picture is on. The sound therefore is stored either optically on the film track or by the more familiar magnetic recording process on the sound track. The sound track approach is ideal for sound movies since recording the sound and picture on the same material precludes lip synchronization problems.

At first glance, it would seem that the sound track approach to recording of sound together with motion pictures is simple and straightforward. Motion picture film, however, is not advanced at a continuous rate through a camera or projector. Rather the film is advanced frame by frame at a continuous intermittent rate allowing each frame to dwell in proper registration in the projector or camera for a predetermined short time interval. During the dwell period of the film no sound can be recorded. Therefore, in both the camera and projector, equipment must be present which allows use of the sound track area of the film for sound recording while the frame of the film is stationary in the camera or projector. This equipment renders the sound track approach uneconomical for the low price consumer market.

In the past number of years the magnetic tape recorder has become a common device finding its way into millions of homes. The magnetic tape recorder is employed to record and play back sound and music in the home.

Many people having both a silent movie camera and a magnetic tape recorder have been tempted with the idea of making talking home movies. It seems like a simple enough task since the two basic components necessary are already available.

Those people who have been adventurous enough to try making their own home sound movies employing merely a silent movie camera and a tape recorder have found that the task is not as simple as one might think.

The earliest sound movies, so-called "talkies," were in fact produced by a silent projector and tape recorder. In those days the equipment necessary to synchronize the picture with the sound was so expensive and complicated that the present day light sound track method has completely supplanted it. The problem in synchronizing sound and picture by employing an independent camera and magnetic tape recorder is more difficult than the light sound track approach.

Not only do you have the problem of synchronizing an intermittently driven motion picture film with a continuously driven magnetic tape, you also must insure that the sound and picture are started at about the same time so that there is not a noticeable delay between the lip movement and words being said. Those who have worked with tape-film systems have also found that magnetic tape stretches over its life while movie film does not. Therefore a usable tape-film home movie system must be designed to be insensitive to this problem.

In order to reach the broadest segment of today's consumer market, it is necessary to design equipment which requires the minimum of mechanical or technical ability upon the part of the user. Here again the sound track approach to motion picture sound recording is advantageous because there is only one film to be inserted in the projector. Therefore, a system which takes advantage of an inexpensive silent movie camera and a tape recorder must not tax the user mechanically and technically by requiring insertion of two recording strips (i.e. picture film and sound tape) in registration in a projector.

Therefore, a cassette containing both the magnetic tape and the motion picture film seems necessary if one were to attempt to reduce the cost of sound motion pictures through the use of silent film and magnetic tape. Here again, the problems which face the designer are those of lip synchronization, the different type of drives, (i.e. intermittent and continuous) of the two recording media and the tape stretching over its life.

A further problem which presents itself if the cassette approach is attempted involves getting light behind the film. In order to project pictures on a screen, an intense light source must be provided behind and transverse to the axis of the film.

BRIEF DESCRIPTION OF THE INVENTION

In accordance with this invention a home sound movie projector is provided in which a motion picture film and a magnetic recording tape are wound interleaved on a reel. The reel is mounted in a cassette for rotation. The tape and the film on the reel each follow a path through the cassette. Each path includes a guide roller mechanism. A portion of the film comes close to a first cutaway section of a wall of the cassette. The tape's guide roller mechanism includes a mechanism for maintaining a tension on the tape to take up any slack which develops in the tape and also help in smoothing out the instantaneous tape velocity as it travels along its path.

A half silvered mirror is mounted in the cassette at an angle with respect to a line normal to the plane in which the film travels along the part of the path adjacent to the cutaway section of the wall. A second wall adjacent to the mirror is constructed from a transparent material to allow light to shine into the cassette on the mirror, through the film and out of the cassette through the cutaway wall.

The projector into which the cassette is inserted includes a motor driven in a constant torque mode for maintaining a constant torque on the tape and film. A well known type of shutter mechanism engages the film and moves it at a predetermined intermittent rate along its path. The motor, in keeping a constant torque, takes up the film as it is advanced along its path by the shutter mechanism. In taking up the slack, the tape is moved by the motor along its path at the predetermined intermittent rate determined by the shutter mechanism.

An idler pulley in the projector engages the magnetic tape in the cassette. The idler pulley is attached to a flywheel to convert the intermittent drive of the tape into a smooth linear flow of tape. The constant tension mechanism acts in cooperation with the flywheel in this regard by taking up and letting out magnetic tape keeping the average velocity of the tape and the film equal but allowing the tape to move with a relatively constant speed necessary for magnetic tape playback and the film to move in the intermittent mode necessary for projection of motion pictures. The constant tension device also serves to compensate for stretching which the magnetic tape will experience over its normal life span with respect to the film.

A high intensity light source is mounted in the projector adjacent to the transparent material of the cassette to shine on the mirror, through the film and out of the cutaway wall of the cassette.

DESCRIPTION OF THE DRAWINGS

FIG. 1 is an isometric view of the front of a sound movie projector built in accordance with the teachings of this invention;

FIG. 2 is an isometric view of the back of the sound movie projector of FIG. 1 showing the controls thereof and a cassette receiving opening:

FIG. 3 is an exploded isometric view of a cassette holding movie film and magnetic tape constructed in accordance with the teachings of this invention;

FIG. 4 is a cutaway isometric view showing further details of the cassette shown in FIG. 3;

FIGS. 5 and 6 are exploded isometric views of the sound movie projector shown in FIGS. 1 and 2 with the cover removed to illustrate details thereof; and FIG. 7 is a schematic view of a drive circuit for a motor used in the projector of this invention.

DETAILED DESCRIPTION OF THE INVENTION

Figure 6:
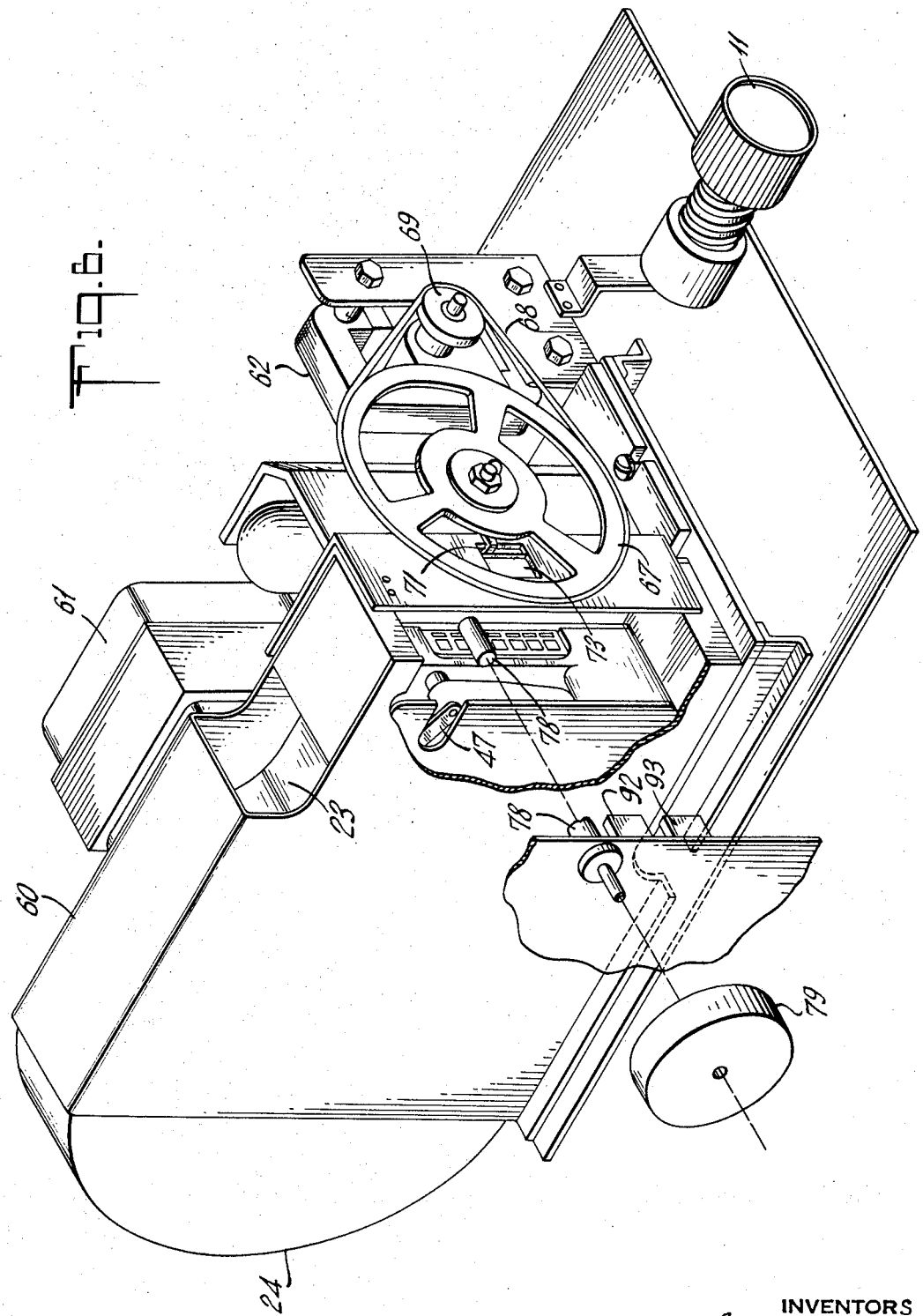

Referring now to FIG. 1, we see, a sound movie projector constructed in accordance with the teachings of this invention. A front panel 10 of the projector has a zoom lens 11, an opening 12 behind which a speaker is mounted, and an air grill 13 through which air for cooling the projector is exhausted. On the top of the projector is a handle 14. Under the projector is an adjustable support leg 16 used for adjusting the tilt of the projector to properly place the picture on a screen, not shown.

FIG. 2 shows the opposite side of the projector shown in FIG. 1. On a back panel 17 of the projector opposite the front panel 10 is an air intake grill 18, three control knobs 19, 21 and 22, and an opening 23 through which a cartridge containing interleaved film and magnetic tape may be inserted.

FIG. 3 is a cutaway exploded view of a cartridge 24 employed in cooperation with the projector shown in FIGS. 1 and 2. The cartridge 24 includes two end plates 26 and 27 fastened to a housing 28, which give the cartridge 24 its general shape and appearance.

A shaft 29 is mounted for rotation between the end plates 26 and 27. The end plate 26 has a small bearing 31 for receiving a turned down end 32 of the shaft 29. The end plate 27, on the other hand, has a bearing 33 with a larger opening therethrough for receiving a fixture 34 connected to the other end of the shaft 29 for engagement with a drive motor assembly.

A pair of reels 36 and 37 are mounted side by side on the shaft 29 separated by a spacer 38. The reels 36 and 37 are secured to rotate with the shaft 29 by unidirectional clutch assemblies. The unidirectional clutch assemblies are arranged so that the reel 36 may be driven in a clockwise direction while the reel 37 rides freely on the shaft 29. On the other hand, the reel 37 can be positively driven in the counterclockwise direction while the reel 36 rides freely on the shaft 29.

A movie film 39 having shutter drive holes 41 along a side thereof and an associated magnetic tape 40 are wound interleaved with a first end in registration about the reel 37. The film 39 is threaded around a plurality of idlers 42, 45 and 44 (see FIG. 4), and back to the second reel 36. The strip of magnetic tape 40 separates away from the film 39 and follows a second path around a roller 47, idlers 48 and 49, a tensioning idler 51 and idlers 52, 53 and 54 before turning to the path of the film 39 and to the second reel 36.

The tensioning idler 51 is affixed to an end of a spring mechanism 56 to hold tape at a tension determined by the spring 56. In this way, any stretching of the tape with respect to the film is compensated for by movement of the spring 56 which takes up and holds a relative constant tension.

Referring again to FIG. 4, a spring 57 is mounted on the first side of the housing 28 to hold the film flat in a plane as it passes by an opening 58 in a front end of the housing 28 through which light may pass. A half silvered mirror 59 is mounted in the housing 28 at a 45 degree angle with respect to a line normal to the plane of the film 39. It should be noted that the end plate 27 is made from a transparent material so that light may be shown therethrough to the silvered mirror 59. In this way, light may be shown into the cassette 24 through the side 27, the film 39, and out the front end of the cassette 24 for projection on a screen, not shown, by the lens 11. In the alternative, a section of the end plate 27 could be constructed from a transparent material while the rest is constructed from an opaque material so long as the transparent section is adjacent to the mirror 59.

Looking now to FIGS. 5 and 6 together for an understanding of the operation of the projector in combination with the cassette 24, we see a frame 60 having a channel therethrough into which the cassette 24 is inserted. Before the cassette 24 is inserted in the channel in the frame 60, the main control knob 22 is rotated to a reverse position rotating a shaft 80 carrying a plurality of cams 81 and an end cam 82 thereon. Rotation of the cams 81 retracts the splined shaft 64 from the channel by movement of levers 83 and 84 mounted on a flange 86 connected to the frame 60. The end cam 82 pushed against a cam follower 87 mounted on a sliding plate 88. The plate 88 is urged by a spring towards the cam 82. The rotation of the shaft 80 pushes the cam follower 87 pushing the plate 88 in the direction away from the cam 82. A shutter mechanism having shutter fingers 71 is mounted on and carried with the plate 88.

After the cassette 24 is inserted in the channel in the frame 60, the knob 22 is rotated to allow the plate 88 to move toward the cam 82 so that the shutter finger 71 passes through an opening 73 in the front wall of the cassette 24 engaging the finger engaging holes therein and leaving the splined shaft 64 to press the fixture 66 against the mating fixture 34 in the cassette 24.

The projector has two drive mechanisms for the tape 40 and film 39 in the cassette 24. The first is a drive motor 61 and the second is the shutter drive mechanism turned by a fan motor 62. The drive motor 61 is connected in driving relationship to a shaft 63. The shaft 63 is connected by a splined shaft 64 to an adapter 56 which engages the disc 34 in the cassette 24. The fan motor 62 drives a shutter disc 67 through a belt 68 pulley 69. The shutter disc 67 intermittently drives a shutter finger 71 which engages the shutter drive holes 41 in the film 39 through an opening 73 in the front wall of the cassette 24. The shutter fingers 71 cooperate with the shutter disc 67 to advance the film 39 frame by frame so that one frame is properly positioned with respect to one of the openings 72a through 72c in the shutter disc 67 each time an opening passes the front wall of the cassette 24. Therefore, the shutter finger 71 advances the film 39 once for each rotation of the shutter disc 67. The shutter mechanisms including the shutter disc 67 and the shutter finger 71 are in common usage in motion picture projectors and are available commercially as a unit.

FIG. 7 shows the electrical drive supplied to the split phase induction motor 61 with a direction switch 75 positioned for forward drive. Voltage is applied by a high gain differential amplifier 74 to the motor 61 through contacts 75a and 75b of a double pole triple throw switch 75. The switch in this position puts the motor 61 in series with a small sampling resistor 76. A voltage is applied to a first input of the differential amplifier 74 from a reference voltage source divided down by a resister chain 77. The other input of the amplifier 74 is connected by a lead 78 to the sampling resistor 76. In this way the current through the motor 61 is held constant by the amplifier 74. The constant current through the motor 61 is determined by the voltage applied to the first input of the amplifier and the value of the resistor 76. In this way the torque supplied by the motor 61 is held constant without regard to the angular velocity thereof. The torque chosen for the drive motor 61 in the projector is slightly less than would be necessary to move the tape 40 and the film 39.

Looking again to FIGS. 5 and 6, the force supplied by the shutter fingers 71 to the film 39 moves the film along its path. The movement of the film 39 reduces the torque on the reel 36, the reduction of torque on the reel 36 reduces the torque on the shaft 29, the fixtures 34 and 66, splined shaft 64 back through the drive shaft 63 to the drive motor 61. The motor 61 then rotates to maintain the constant torque, taking up the slack in the film 39 and advancing the tape 40 along its path through the cassette 24.

An idler device 78 is mounted for rotation on the side of the housing 60 to engage the roller 47 when the cartridge 24 is inserted in the housing 60. The tape 40 in the cartridge 24 passes between the idler 78 so that the moving tape will turn the idler 78 and the flywheel 79. Since the tape is being driven at an intermittent rate by the drive motor 61, a flywheel is chosen to have sufficient inertia not responding fully to the intermittent drive. Therefore, the flywheel will rotate at an angular velocity determined by the average linear speed of the tape 40. During the dwell of the motor 61 between intermittent moves of the tape 40, the flywheel 79 will continue to rotate idler 78 thereby driving the tape 40. The spring 56 will move the roller 51 to take up the slack. The tape 40 therefore is driven in a push pull mode by the motor 61 and the idler 78. The motor 61 pulls the tape when the shuttle finger 71 pushes the film. The idler 78 pushes the tape 40 during the dwell period between movement of the film 39. When the motor 61 starts pulling the tape 40 again, the spring 56 plays back some of the tape before the tape 40 begins moving again.

In order to rewind the film in the cassette, the main control knob 22 is turned to the reverse position. In this position, the cam 82 holds the plate 88 away from the frame 60 so that the shutter fingers 71 are disengaged from the film in the cassette 24. On the other hand, the cam 81 keeps the fixture 66 in engagement with the fixture 34 of the cassette 24. The main control switch 22 moves other cams on a shaft 80 to disengage unnecessary electronic elements in the projector and moves the switch 75 so that the motor 61 is electrically connected between the terminals 75E and 75F thereof. In this configuration, the reference voltage source is connected directly across the motor 61 in the sense opposite to the voltage supplied by the amplifier 74 in the forward running mode so that the motor 61 now rotates in a reversed direction at an increased speed to rewind the film and tape back on to the reel 37.

It should be noted that the switch 75 operates to connect the motor 61 to be driven in a constant current mode in the forward direction and a constant voltage mode in its reverse direction. A pair of magnetic tape heads 92 and 93 are mounted on the frame 60 adjacent to the path of the tape 40. The head 92 is a playback head mounted adjacent to the path of the tape 40 for playing back sound recorded thereon. It is connected to circuitry, not shown, in a conventional manner and ultimately to a speaker (not shown). The recording head 93 is provided to allow direct recording of description while a movie is playing. In this way, home movies may be taken, mounted in a cassette with a blank recording tape, and the description of the film can then be recorded directly on to the tape while the films are being viewed. The head 93 is also connected up to conventional circuitry, not shown, for this purpose.

The frame control knob 19 is employed to adjust the position of the pictures on a screen. This knob 19 is connected to a shaft 90 which pivots a frame cam 89 for adjusting a lever 91. The lever 91 adjusts the shutter fingers 71 with respect to the film 39 in the cassette 24.

It should be understood that this embodiment is merely illustrative of the principles of this invention and that numerous modifications will become obvious to those of ordinary skill in the art in light thereof.

What is claimed is:

1. A cassette for holding a strip of motion picture film having a first end and a second end, and a strip of magnetic recording tape having a first end and a second end; said cassette including:

a housing;

means for defining a first path in said housing to guide said strip of motion picture film therethrough;

means for defining a second path in said housing to guide said strips of magnetic recording tape therethrough; said first and second paths coinciding along a portion thereof and differing along a portion thereof; and a tensioning device mounted in said cassette along said portion of said second path where said first and second paths differ.

2. The cassette as defined in claim 1 also including:

a first reel for receiving said first ends of said tape and film;

a second reel for receiving said second ends of said tape and film; and means for mounting each of said first and second reels for unidirectional rotation with respect to said housing; said first reel being mounted to rotate in a first direction with respect to said housing and said second reel being mounted to rotate in a second direction with respect to said housing.

3. The cassette as defined in claim 2 also including:

a tensioning device mounted in said cassette along said second path.

4. In combination:

a housing;

a first reel mounted for rotation with respect to said housing;

a length of motion picture film having a first and a second end;

a length of magnetic recording tape having a first and a second end;

means for affixing said first end of said film and said tape to said first reel to wind said tape and film on said reel in an interleaving fashion upon rotation of said reel;

means for defining a first path of travel in said housing for said motion picture film; and means for defining a second path of travel in said housing for said magnetic recording tape; said second path of travel including means for maintaining a predetermined tension on said magnetic recording tape.

5. The combination as defined in claim 4 also including:

means connected to said second ends of said film and said tape for maintaining a constant tension on said film; and means for advancing said film at an intermittent rate so that said means for maintaining said constant tension on said film will take up the film as it is advanced thereby pulling on said tape advancing said tape along said second path.

6. The combination as defined in claim 5 also including:

inertial means mounted adjacent to said second path and in contact with said magnetic recording tape for inertially causing said tape to travel at a rate related to the average velocity of said intermittently driven film but at a more constant instantaneous rate.

7. The combination as defined in claim 6 in which said means for maintaining a predetermined tension on said tape includes a guide roller on which said tape travels; and said inertial means includes an idler roller for holding said tape against said guide roller to alternately drive and be driven by said tape.

8. The combination as defined in claim 7 in which said inertial means includes a fly wheel attached to said guide roller.

9. The combination as defined in claim 8 in which said means connected to said second ends of said film and tape is a second reel and said first reel is mounted for unidirectional rotation in a first direction in said housing on a shaft; said combination including:

means for mounting said second reel on said shaft for unidirectional rotation in said housing in a direction opposite to said first direction.

10. The combination as defined in claim 9 also including:

a mirror mounted in said housing surrounded by said film, said film extending from said first reel along said first path back to said second reel.

11. A machine for projecting pictures stored on a strip of film having shutter fingers engaging holes therein; said strip of film being wound on a reel, said reel being mounted for rotation in a cassette, said machine including:

receiving means for receiving and holding said cassette in a predetermined position with respect thereto;

a shutter mechanism, said shutter mechanism including shutter fingers;

first mounting means for mounting said shutter mechanism in moving relationship with respect to said receiving means; said first mounting means normally urging said shutter fingers towards said receiving means to engage said shutter finger engaging holes when said cassette is held in said receiving means;

means for adjustably holding said shutter mechanism away from said receiving means;

means for engaging said cassette and rotating said reel when said cassette is held in said receiving means;

second mounting means for mounting said reel rotating means in moving relationship to said receiving means;

means cooperating with said shutter mechanism holding means for moving said second mounting means;

a magnetic tape reading head mounted adjacent to said receiving means;

a motor for driving said reel rotating means; and means cooperating with said shutter mechanism holding means for running said motor in a current mode once said shutter mechanism is near said receiving means and for running said motor in a voltage mode when said shutter mechanism is held away from said receiving means.

12. The machine as defined in claim 11 also including:

an inertial idler pulley mounted for rotation adjacent to both said receiving means and said magnetic tape reading head.

13. The machine as defined in claim 12 also including:

a high intensity projection lamp mounted adjacent to said receiving means.

References Cited

UNITED STATES PATENTS

| 3,498,703 | 3/1970 | Gerry | 352—72 X |
| 1,843,972 | 2/1932 | De Forest | 352—31 |
| 3,466,123 | 9/1969 | Skuja | 352—72 |
| 3,240,329 | 3/1966 | Custin | 352—31 X |
| 3,547,529 | 12/1970 | Anthes | 352—31 |
| 3,252,372 | 5/1966 | Gallina | 352—78 X |

FOREIGN PATENTS

| 432,236 | 3/1967 | Switzerland | 352—72 |
| 1,148,499 | 4/1969 | Great Britain | 352—72 |

LOUIS R. PRINCE, Primary Examiner

J. W. ROSKOS, Assistant Examiner

U.S. Cl. X.R.

352—72